United States Patent [19]

Guckes et al.

[11] Patent Number: 4,946,940

[45] Date of Patent: Aug. 7, 1990

[54] PHASE SEPARATION PROCESSES

[75] Inventors: Terry L. Guckes, Randolph, N.J.; Mark A. McHugh, South Bend, Ind.; Charles Cozewith, Westfield; Ronald L. Hazelton, Chatham, both of N.J.

[73] Assignee: Exxon Research and Engineering Company, Florham Park, N.J.

[21] Appl. No.: 232,713

[22] Filed: Aug. 16, 1988

Related U.S. Application Data

[63] Continuation of Ser. No. 903,262, Sep. 3, 1986, abandoned, which is a continuation of Ser. No. 685,313, Dec. 24, 1984, abandoned, which is a continuation of Ser. No. 565,162, Dec. 23, 1983, abandoned.

[51] Int. Cl.$^5$ .............................................. C08F 6/10
[52] U.S. Cl. .................................... 528/483; 528/490; 528/491; 528/498; 208/311; 208/319
[58] Field of Search ............... 528/490, 491, 483, 498; 208/319, 311, 952

[56] References Cited

U.S. PATENT DOCUMENTS

| | | | |
|---|---|---|---|
| 3,496,135 | 2/1970 | Caywood, Jr. | 260/45.8 |
| 3,553,156 | 1/1971 | Anolick et al. | 260/33.6 |
| 3,726,843 | 4/1973 | Anolick et al. | 260/80.78 |
| 3,932,371 | 1/1976 | Powers | 260/85.3 R |
| 4,319,021 | 3/1982 | Irani et al. | 528/498 |
| 4,444,922 | 4/1984 | Gutowski et al. | 523/339 |
| 4,623,712 | 11/1986 | Irani et al. | 528/498 |

OTHER PUBLICATIONS

A. K. McClellan et al., "Polymer Solution–Supercritical Fluid Phase Behavior," pp. 161–178, *Supercritical Fluid Technology*, edited by J. M. L. Penninger et al., 1985 Elsevier Science Publishers B.V.
A. K. McClellan et al., "Separating Polymer Solutions Using High Pressure Lower Critical Solution Temperature (LCST) Phenomena," pp. 1088–1092, *Polymer Engineering and Science*, vol. 25, No. 17, Mid-Dec. 1985.
M. A. McHugh et al., "High-Pressure Phase Behavior of Binary Mixtures of Octacosane and Carbon Dioxide," pp. 493–499, American Chemical Society, 1984, reprinted from I&EC Fundamentals, 1984, 23.
M. A. McHugh et al., "Separating Polymer Solutions with Supercritical Fluids," pp. 674–680, American Chemical Society, 1985, reprinted from Macromolecules, 1985, 18.
Tager, "Application of Phase Rule to Polymer Solutions," pp. 334–339, *Physical Chemistry of Polymers*, Ch. 13, True Polymer Solutions, 1972.
L. Zeman et al., "Pressure Effects in Polymer Solution Phase Equilibria," *Journal of Physical Chemistry*, 76, 1206 (1972).
C. A. Irani et al., "Lower Critical Solution Temperature Behavior of Ethylene Propylene Copolymers in Multicomponent Solvents," *Journal of Applied Polymer Science*, 31, pp. 1879–1899 (1986).

*Primary Examiner*—Paul R. Michl
*Assistant Examiner*—Lee C. Wright
*Attorney, Agent, or Firm*—W. G. Muller

[57] ABSTRACT

A separation process has been found in which a polymer-solvent solution separates into phases of highly different composition which are in equilibrium over a broad temperature range. Upon addition of the phase separating agent, which is near or above its supercritical conditions, rapid disengagement into two phases occurs. The relative volume of solvent rich phase is substantially larger than the polymer rich phase. The process can be practiced at relatively low temperatures such as those employed in polymerization or post-polymerization processes. The separation is accomplished by adding or elevating the concentration of a phase separation agent to or above a minimum effective concentration, which causes the UCST and LCST lines to merge. Suitable phase separating agents are organic and inorganic compounds that are gases at 1 atm pressure and 25° C. Due to the gaseous nature of the phase separating agent, it is easily removed from the solvent phase for reuse in the process.

23 Claims, 7 Drawing Sheets

PHASE SEPARATION PROCESSES

This is a continuation of application Ser. No. 903,262, filed 9/3/86, now abandoned, which is a continuation of application Ser. No. 685,313, filed 12/24/84, now abandoned, which is a continuation of application Ser. No. 565,162, filed 12/23/85, now abandoned.

BACKGROUND OF THE INVENTION

In many polymer processes the polymerization reaction is carried out in a vehicle which is a solvent for both the monomers to be polymerized and the polymer formed. In such solvent polymerization processes, the separation of the polymer from the vehicle is generally an energy intensive step where the separation is usually carried out by steam stripping or other suitable solvent evaporation techniques. It has long been recognized that substantial economies in polymer processes could be achieved if the energy requirements of the solvent-polymer separation step could be minimized.

It is well known that many solvent-polymer solutions are stable over a limited temperature range and can be caused to separate into a solvent rich and polymer rich phase by heating or cooling. Upon heating, these solutions exhibit a lower critical solution temperature (LCST) above which separation of the polymer from the solvent system will occur. This separation results in the formation of two distinct phases, one a solvent rich phase, the other a polymer rich phase. These phase separation phenomena are generally pressure dependent, and the two phase systems can be made to revert to a homogeneous single phase by isothermally increasing the pressure of the system above a critical value which depends upon the composition of the solution and the molecular weight of the polymer. The phase behavior of a typical polymer solution is shown schematically in FIG. 1A, as is discussed later.

The LCST is that temperature above which a solution will separate into two distinct phases, a solvent rich phase and a solute rich phase. The separation phenomenon can also occur at a second lower temperature termed the Upper Critical Solution Temperature (UCST). Below the UCST a two phase separation again occurs. The measurement of LCST and UCST end points are made at the vapor pressure of the solution. The prior art teaches a number of methods of utilizing the LCST as a means for causing a polymer solution to separate into a polymer rich phase and a solvent rich phase.

Illustrative prior art processes which have utilized the LCST phenomenon in polymer separation processes are those described in U.S. Pat. Nos. 3,553,156; 3,496,135; and 3,726,843 incorporated herein by reference.

These prior art processes are disadvantageous in that a significant amount of heat energy is required to raise the temperature to the point where the desired phase separation occurs. Furthermore, separation occurs at elevated temperatures which may result in polymer degradation. Separation processes utilizing the UCST are also disadvantageous because of the need to cool the solutions. More recently, in their U.S. Pat. No. 4,319,021, Irani, et al. have taught an improvement in the foregoing phase separation processes which permits the use of lower separation temperatures. The technique described in this patent includes the addition of a low molecular weight hydrocarbon to the polymer solution. Suitable low molecular weight hydrocarbons are the $C_2$–$C_4$ alkenes and alkanes which are utilized at about 2 to about 20 weight percent. While this improved process substantially reduces the phase separation temperature, heating is still required in order to affect the desired separation.

There is need for a process technique which would permit the aforedescribed separation processes to be carried out at or near the polymerization reaction exit temperature. In that way, little or no additional heat input would be required to effect the separation. Heretofore, such idealized, improved processes have not been achieved.

SUMMARY OF THE INVENTION

It has been surprisingly found that a temperature independent phase separation can be caused to occur in a polymer solution by introducing into the polymer solution a critical amount of phase separation agent. Below the critical concentration of the phase separation agent, the mixture exhibits a normal, lower critical solution temperature ("LCST"). Compounds useful as phase separation agents in the practice of this invention include $CO_2$, $C_1$–$C_4$ alkanes, $C_2$–$C_4$ alkenes, $C_2$–$C_4$ alkynes, hydrogen, nitrogen and its various oxides, helium, neon, CO and mixtures thereof.

Sufficient phase separation agent (PSA) is introduced into the polymer solution so that the solution, under appropriate pressures, can separate out a polymer rich phase at all temperatures between the LCST and the UCST of the pure polymer-solvent system, essentially free of PSA. The consequent phase separation results in a polymer rich phase and a solvent rich phase. Where methane is used as the PSA, under appropriate conditions for hydrocarbon polymers, the solvent rich phase comprises about 80% or more by volume of the total system and is substantially free of polymer.

DETAILED DESCRIPTION

Figure 1A:
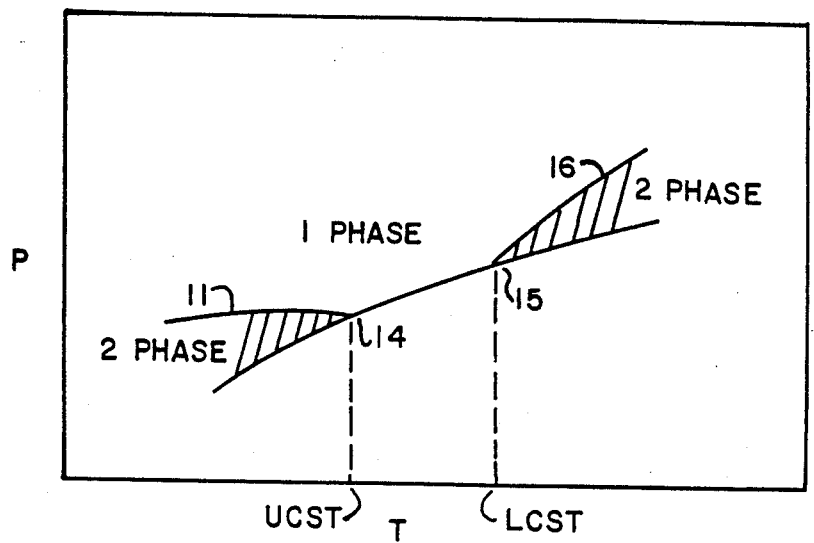
FIG. 1A - Prior Art Phase Diagram

This invention relates to a method for separating a polymer from solution. The prior art teaches methods for utilizing the LCST as a means for causing a polymer solution to separate into a polymer rich phase and a solvent rich phase. The disadvantages of these prior art methods have been disclosed.

The method of the instant invention relies on the discovery that the addition of a critical amount of a particular phase separation agent will cause phase separation to occur, under appropriate pressure conditions, over a broad temperature range, thereby eliminating the need for heating or cooling the solution in order to cause separation. As used in the specification and claims, the "phase separation agent" (PSA) is a compound that is normally gaseous at 1 atmosphere and 25° C. When used in the system according to this invention, the PSA is normally near or above its critical conditions. Below a particular pressure, unique to each PSA-polymer-solvent system, the system can be caused to separate into distinct phases. Increases in pressure reverse the phenomenon and result in a homogeneous system.

Reference has been made to separation occuring over a broad temperature range. As used in the specification and claims the term "broad temperature range" means the temperature range that encompasses the UCST and LCST as determined for a solvent-polymer system, free of monomers, PSA or other extraneous compounds. By comparison of FIG. 1A and FIG. 1B, it can be seen that the "broad temperature range" for which the separation phenomena of FIG. 1B can be practiced encompasses the temperature region between the UCST and LCST illustrated for FIG. 1A.

The separation method of this invention can be applied to solutions of polymers It is most advantageously used in conjunction with a solution polymerization process. It has particular utility where the solvent from which the polymer is to be separated is a hydrocarbon solvent.

The phase separation agents of this invention are gases at atmosphere pressure and 25° C, and include $H_2$, $N_2$ and its oxides, He, Ne, CO, $CO_2$, $C_1$-$C_4$ alkanes, $C_2$-$C_4$ alkenes, $C_2$-$C_4$ alkynes and mixtures thereof. Halogenated $C_1$-$C_3$ hydrocarbons which are normally gases at atmospheric pressure and 25° C. may also be used as phase separation agents The preferred halogenated compounds are fluorinated hydrocarbons. Naturally occurring mixtures of gases, e.g., natural gas, petroleum gas, etc. may also be used as the PSA.

Illustrative examples of hydrocarbons suitable for use as phase separation agents in the practice of this invention are methane, isobutane, ethylene, ethane, propane, propylene, butane, 1-butene, 2-butene, isobutylene, acetylene, propadiene, 1,4-butadiene, dichlorodifluromethane, monochlorotrifluoromethane, trifluoromethane, methylchloride, monochloropentafluoroethane, hexafluoroethane, trifluoroethane, pentafluoroethane, monochlorotrifluoroethylene, tetrafluoroethylene, vinylidene fluoride and vinyl fluoride. For the production of ethylenepropylene or ethylene-propylene-non-conjugated diene copolymers, methane, ethane, propane, ethylene and propylene are the preferred hydrocarbon PSA's.

In terms of solution thermodynamics, the essence of this invention lies in the discovery that for certain PSA-polymer-solvent systems, the LCST and UCST coincide at or above a particular critical concentration of PSA. Further, in polymer solution, in the region of this coincidence, phase separation of the system into a polymer rich phase and a solvent rich phase occurs rapidly over a broad temperature range when the pressure is below a particular value for the system in question. As a result, no energy input for heating or cooling the solution is required to recover the polymer.

Unlike the teachings of Irani, et al; U.S. Pat. No. 4,319,021, heating of the solution is not a necessary part of this invention. However, heating may be advantageously used to increase the extent of separation of polymer from solvent; that is, to achieve a solvent rich phase essentially free of polymer when the minimum critical concentration of PSA is being used. Where heating is to be utilized, it is preferred that only the solvent rich phase be heated and that during the heating step the solvent rich phase pressure be above the phase separation pressure for the solvent-polymer-PSA system in order to avoid fouling of heat transfer surfaces. The solvent rich polymer solution can be heated to a temperature of about 0° F. to about 150° F. above its initial temperature e.g., the polymerization reactor temperature.

Figure 1B:
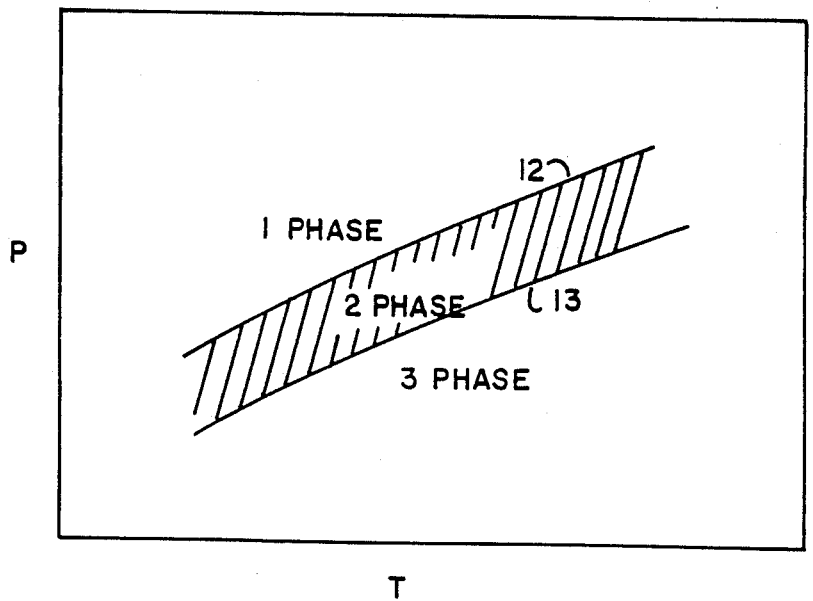
FIG. 1B - Phase Diagram of this Invention

When the critical level of PSA in a system is reached, there is a dramatic change in the phase relationships of the system. This is illustrated in FIG. 1B. For a given overall system composition with the components being polymer, solvent and PSA, there is a single liquid phase shown as '1 Phase' in the higher regions, there are two liquid phases in the cross hatched area designated '2 Phase' and three phases composed of two liquids and a vapor in the region designated '3 Phase'. The curve shown as line 12 separates the 1 Phase and 2 Phase regions. The curve line 13 separates the liquid/liquid of 2 Phase and the liquid/liquid/vapor or 3 Phase regions. The separation into solvent rich and polymer rich liquid phases over the broad temperature range is the outstanding feature of FIG. 1B.

Several additional noteworthy features of FIG. 1B deserve particular mention. First, the phase relationships are reversible in that changing operating conditions to slightly above or below the phase boundary curves and then returning to the original conditions will cause the respective single phase, two phase or three phase region to disappear and then reappear. Second, the '2 Phase' region is stable over the temperature regions extending below the LCST and down to the UCST. This means that stable, low temperature separations can be achieved. Third, there is now a continuous phase boundary between the liquid/liquid and the liquid/liquid/vapor region over temperature ranges of interest in polymer solvent separations. This means that either two phase or three phase separations near the boundary line can be practiced. It is also evident that the temperature sensitive phase relationships illustrated in FIG. 1A are overcome. The separations achieved with the invention are possible because of the new phase relations which have lower temperatures, wider stability regions and expanded two phase-three phase boundaries.

It can also be seen from FIG. 1B that curve 13 is the vapor pressure curve for the overall system composition. As pressure is slightly reduced below curve 13, the first bubble of vapor in the system will form. Hence, curve 13 is referred to as the bubble point line. Because the PSA is the most volatile component, the first bubble and the vapor phase in general will be predominantly PSA. In the three phase region, near the bubble point line, the system will separate into a solvent rich liquid, a polymer rich liquid phase and a vapor that is essentially PSA.

While the method of this invention will generally be carried out at a pressure which is at or above the bubble point line, it may also be advantageously carried out at lower pressures when a relatively small vapor phase can be present. For separation to occur, the pressure will be at ranges where either the liquid/liquid or liquid/liquid/vapor phases are formed. As used in the specification and claims, the term "bubble point pressure" means the vapor pressure of the solvent/solute/PSA system at a particular temperature. The "bubble point line" is a plot of pressure vs. temperature, which is the locus of the bubble point pressures for such a system.

The amount of PSA required to reach the critical concentration is a function of the solvent, the type of polymer, the polymer molecular weight, molecular weight distribution, and composition, and the composition and purity of the PSA. Thus no specific value exists for all situations.

In order to determine the critical concentration, it is necessary to prepare compositions of polymer solution and PSA and measure the temperatures at which phase separation occurs These techniquires are well known in the art and readily accomplished by the experienced practitioner. For example, a small amount of PSA is dissolved in a polymer solution of given composition at a pressure just sufficient to prevent formation of a vapor phase. The solution is cooled until turbidity first appears. This temperature is the UCST. The solution is further cooled and the pressure increased until the turbidity disappears. This pressure/temperature combination defines a point on the one phase/two phase boundary shown by the upper curve, 11, in the left hand side of the phase diagram of FIG. 1A. Cooling in increments followed by pressure increases and decreases to cause the disappearance and appearance of turbidity will define the shape of the entire curve. The solution is now heated, while maintaining a pressure just sufficient to prevent formation of a vapor phase, until turbidity appears. This temperature is the LCST. Further heating is then carried out with pressure increases and decreases at each temperature to define the shape of the one phase/two phase boundary shown by the upper curve, 16, on the right hand side of figure in FIG. 1A.

Figure 2:
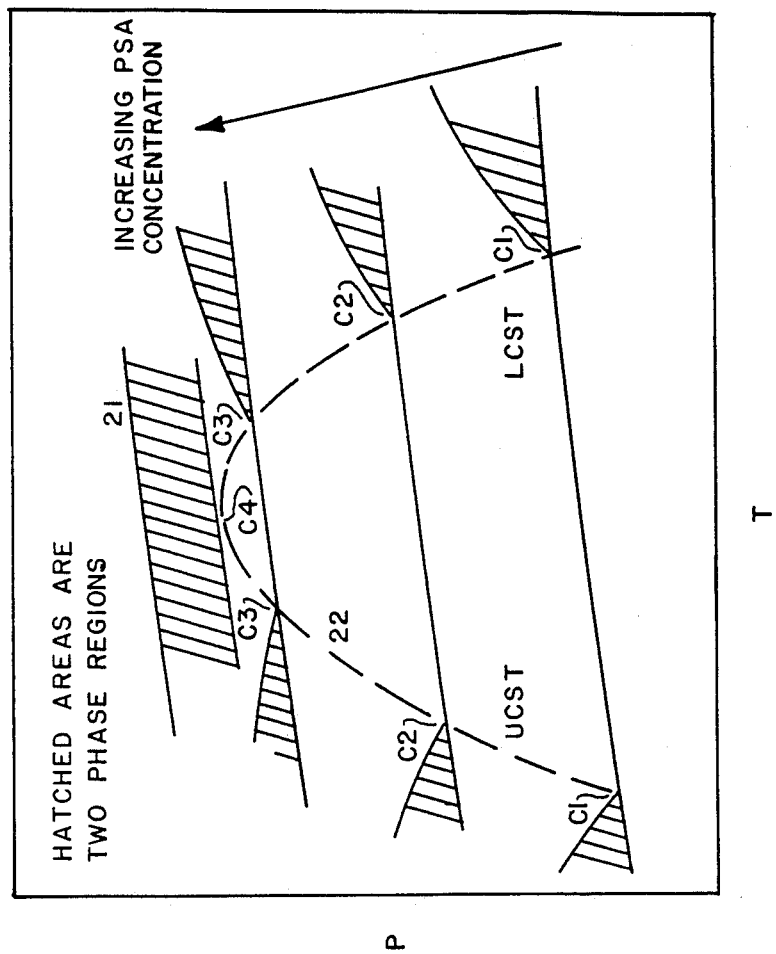
FIG. 2 - Phase Diagrams as a Function of PSA Concentration

These measurements are repeated with increasing concentrations of the PSA. A series of phase diagrams will result as shown schematically in FIG. 2, which indicates increasing UCST and decreasing LCST as the concentration of PSA increases. At or above the critical concentration, the USCT and LCST are equal and phase separation occurs at all temperatures provided the pressure is below that represented by the upper line, 21 of FIG. 2. Each of the parameters ($C_1$, $C_2$, $C_3$ and $C_4$) represents a different concentration of PSA, and the dashed curve, 22, is a plot of the LCST and UCST as a function of concentration.

Figure 3:
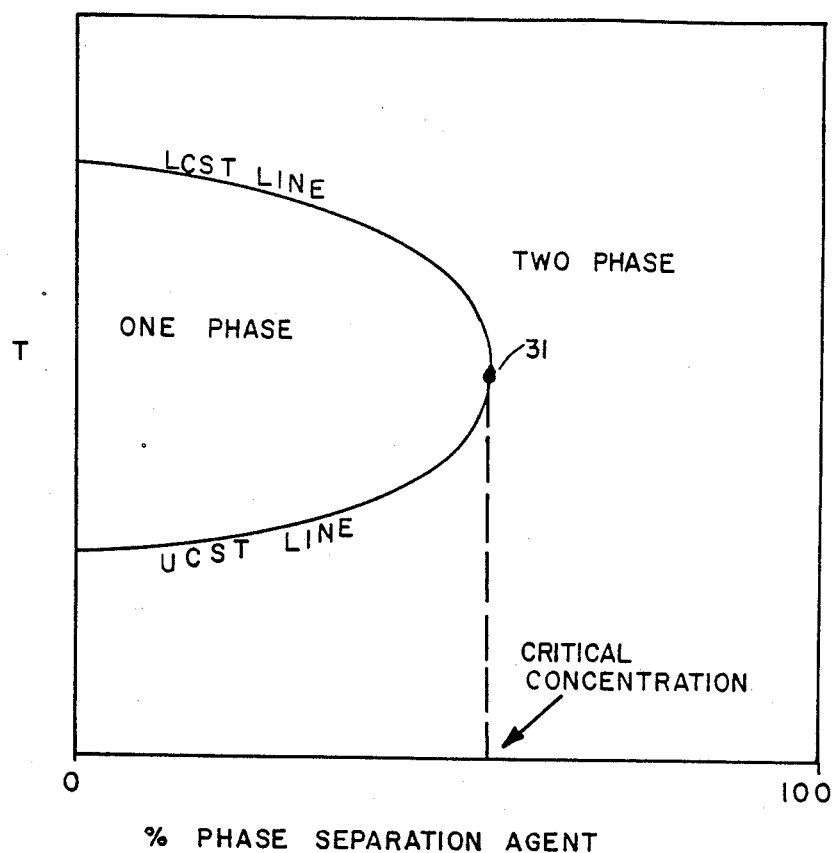
FIG. 3 - Illustration of a Critical Concentration Diagram

The minimum critical concentration is obtained by plotting UCST and LCST versus PSA concentration as shown in FIG. 3. The point of coincidence, 31, of the UCST and LCST defines the minimum critical concentration.

The process of this invention may be applied to the separation of a broad range of polymers. Illustrative of solution polymerization processes to which the separation process of this invention may be applied are processes for preparing butyl rubber, polyisoprene, polychloroprene, polybutadiene, polybutene, ethylene-propylene rubber (EPM), ethylene propylene-nonconjugated dienes which may be utilized in preparing EPDM include methylene norbornene, ethylidene norbornene, 1–4 hexadiene, dicyclopentadiene, etc.

While polymer separation processes are generally considered in the context of solution polymerization processes, it is often necessary to affect such separations in processes other than polymerization processes For example, butyl rubber is halogenated by first dissolving the finished polymer in hexane, halogenating the polymer and subsequently recovering the polymer The separation process of this invention is equally applicable to such a separation.

Illustrative non-limiting examples of the solvents which can be used in the practice of this invention are linear, branched or cyclic $C_5$–$C_8$ hydrocarbons. They include the isomers of pentane, hexane, heptane, octane, benzene, toluene, xylene, cyclohexane or mixtures thereof.

The process of this invention can be carried out in either a batch or continuous manner; however, a continuous process is generally preferred for economic reasons. The preferred procedure in obtaining polymer separation by utilizing this invention is as follows:

1. The critical concentration of PSA is dissolved in the polymer solution at a minimum pressure of at least the vapor pressure of the resulting solution. Agitation may be desirable to obtain rapid dissolution. Turbulence in a flowing stream can provide the necessary agitation. Furthermore, it may be desirable to prevent polymer phase separation during the dissolution step. In that case dissolution is carried out at a pressure high enough to maintain the system as a one phase system.

2. Phase separation is allowed to occur. Where elevated pressures are used to maintain a single phase, it is necessary to reduce the pressure in order to achieve the two phase condition. The polymer phase is recovered by gravity settling, centrifugation, or other suitable means.

3. The pressure is reduced on the light, solvent rich phase to vaporize the PSA. Heating or cooling of the solvent rich phase to assist in the recovery of the particular PSA may also be desirable. The recovered PSA and solvent, after purification, if needed, can now be reused in step 1.

The advantages of this invention may be more readily appreciated with reference to an ethylene-propylene rubber (EPM) process and the following examples.

Typical EPM processes are based on a solution polymerization process in an isomeric hexane diluent catalyzed by a Ziegler catalyst. The polymerization is carried out in a stirred tank reactor. The product stream contains about 5 to about 12 weight percent polymer in hexane. In order to obtain a stable product, it is desirable to remove catalyst residue from the polymer in a deashing step.

Solvent and unreacted monomers are steam stripped from the deashed polymer in coagulation drums to form an aqueous slurry of rubber particles. The rubber particles are separated from the slurry and then finished by extrusion drying. In this steam stripping step of the process, large energy requirements increase production costs. Application of the separation process of this invention greatly reduces these energy requirements.

For purpose of illustration, the separation method of this invention is described in terms of its utilization after the deashing step using methane as the PSA.

Figure 4:
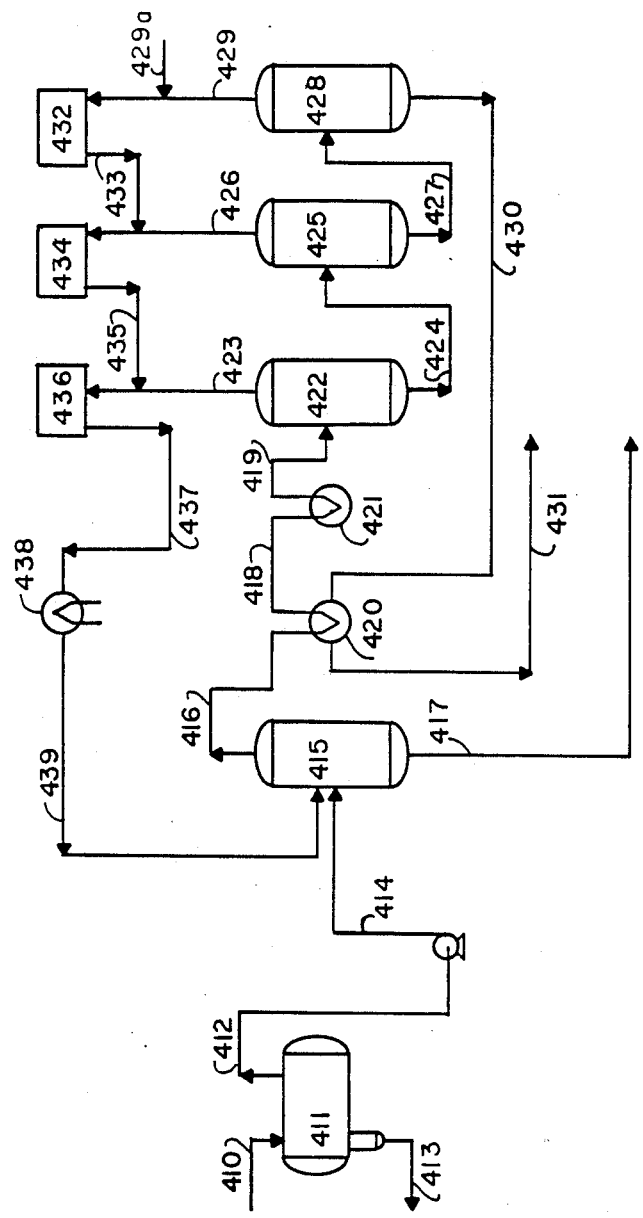
FIG. 4 - Process Flow Diagram

FIG. 4 is an illustrative process flow sheet of the separation method of this invention as applied to a solution of ethylene-propylene rubber in a hexane solvent. The solution is polymerization reactor effluent which has been subjected to deashing.

The polymerization effluent flows from a reactor by line 410 to a settler, 411. The settler is at 100° F., Water is discharged by line 413, the solution flows by line 412 to a pump, where it is pressurized to flow by line 414 into a separation vessel 415. In the vessel, the polymer solution and PSA, here methane, are mixed together; this is at a pressure of 1600–2600 psia and a temperature of 100° F. Methane is introduced as a recycle stream by line 439. Alternatively, it can be supplemented with PSA entering with the polymer solution.

The conditions in the vessel allow a heavy polymer rich phase to settle and leave by exit line 417. The lighter solvent rich phase leaves by the overhead line 416.

In this embodiment, the solvent rich phase is processed to recover the solvent and PSA separately. It goes to a first heat exchanger, 420, where it is cooled to 61° F. It goes by line 418 to a second heat exchanger, 421, where it is cooled to 44° F. It then flows by line 419 to a first flash drum, 422. It is flashed at 515 psia to an overhead vapor leaving by line 423 and a bottom liquid which flows by line 424 to a second flash drum, 425. There it is flashed at 215 psia and at 38° F. The overhead vapor leaves by line 426, while the bottom liquid flows by line 427 to the third flash drum, 428. The final flashing is at 65 psia and 32° F. The overhead vapor leaves by line 429 and joins line 429a for admission to make up methane to flow to the first compressor 432. The bottom liquid flows by line 430 to the heat exchanger 420 where it is heated and leaves by line 431. At this point, the bottom liquid is essentially hexane.

In the first compressor, 432, vapor is compressed to 215 psia and leaves by line 433 to flow to the second compressor, 434. In the second compressor, the vapors are raised to 515 psia and leave by line 435 for the third compressor, 436. There it is raised to 2015 psia and sent by line 437 to a heat exchanger, 438, where it is cooled. It leaves by line 439 for the separation vessel, 415. The recycle gas is primarily methane with small amounts of ethylene, propylene and hexane.

In the above illustration, the hexane can be purified and recycled to the polymerization vessel.

After phase separation occurs, some polymer can remain in the solvent phase. It is usually desirable to minimize this quantity for maximum product recovery. However, in the situation where the dissolved polymer represents an undesirable low molecular weight portion of the product, some product quality benefits may be obtainable by retaining this portion of the polymer in the solvent rich phase for later disposal. The amount of polymer left in the solvent phase is a complex function of polymer molecular weight, molecular weight distribution and composition, solvent composition, and amount and composition of the PSA. For this reason the conditions that give maximum amount of polymer separation cannot be quantified with precision. In general, the polymer separation will be enhanced by raising the quantity of PSA added to the solution, raising the temperature, or reducing the pressure to the solution vapor pressure. Also, in a series of homologous hydrocarbon PSA's, selecting the one with the lowest molecular weight will usually produce the lowest amount of polymer in the solvent phase, all other things being equal.

The concentration of PSA in the polymer solution required to reach the "critical concentration" to cause coincidence of the LCST and the UCST is a function of factors such as polymer type, polymer molecular weight and its distribution, polymer concentration and solvent composition as well as the composition and purity of the PSA.

Although there is, in all probability, a specific value which can be assigned to the critical concentration, its precise determination is not practical in view of the complex system which is being analyzed. The term "critical concentration" as used in the specification and claims refers to the minimum concentration which results in the LCST-UCST coincidence.

In order to determine the critical concentration, it is necessary to prepare composition of polymer solution and PSA and measure the temperature at which phase separation occurs. These techniques are well known in the art, and readily accomplished by the experienced practitioner in the manner described above.

It will be evident from this disclosure that after the lower limit of the critical concentration is achieved, further increases in PSA concentration do not minimize the advantageous results obtained by the practice of this invention. Hence, in describing the critical concentration in the specification and claims, it is designated as being "at least" a particular concentration for a particular system.

Figure 5:
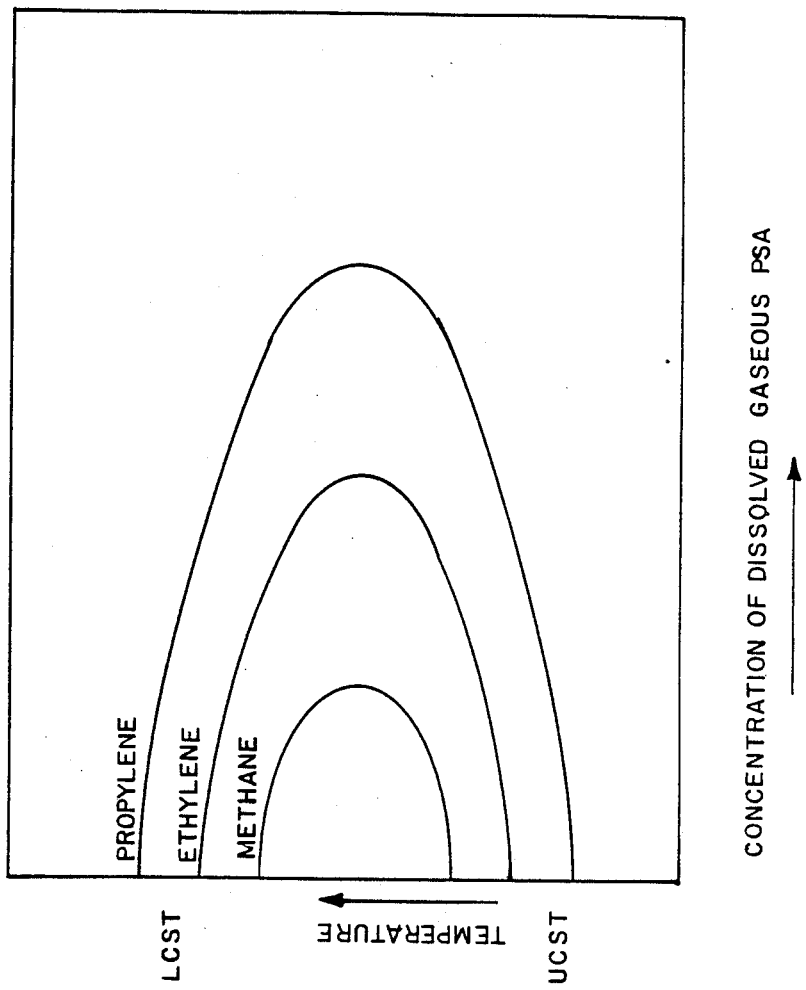
FIG. 5 - Illustration of a Critical Concentration Diagram for Methane, Ethylene and Propylene FIG. 6 - Phase Diagrams for PSA-Hexane-EPM Systems FIG. 7 - Comparison Phase Diagrams for PSA-Hexane EPM Systems

FIG. 5 is a graphic representation of the effect of concentration of PSA on the LCST and UCST. The parameter for the three different curves is the PSA used. It is evident that methane is advantageously used at a lower concentration than either ethylene or propylene. As carbon number increases, the critical concentration increases. A similar curve showing the LCST-UCST coincidence may be generated for any of the other aforementioned PSA. The curves of FIG. 5 are intended as being illustrative of the phenomenon upon which this invention is based.

The following examples utilizing methane and a hexane solution of EPM are illustrative of the invention. Since the greatest difficulty in achieving phase separation is experienced with lower molecular weight polymers, the polymer used was Vistalon grade V-457 (Exxon Chemical Company) which is an elastomeric EPM polymer having a low average molecular weight. This polymer comprises 42.8 weight percent ethylene, has a weight average molecular weight ($M_w$) of 140,000 and a $M_w/M_n$ weight average molecular weight/number average molecular weight ratio of 2.2.

The hexane solvent used comprised about 87 weight percent n-hexane, about 9.4 weight percent methyl cyclopentane, about 2.3 weight percent 3-methyl pentane and trace amounts of other $C_5$–$C_6$ hydrocarbons.

EXAMPLE I

A polymer solution was prepared having an EPM concentration of 5.2 weight percent. In a variable-volume pressure cell, methane was introduced into the polymer solution to give total system concentrations of 11.5 and 13.4 weight percent.

The pressures were increased and decreased repeatedly to determine the liquid/liquid-liquid phase transition and the liquid-liquid/liquid-liquid-vapor phase transitions. At 11.5 weight percent, the upper pressure, shown in FIG. 6 by line 62, was about 2600 psia; the lower pressure, shown by line 62a, was about 1600 psia. Phase separation in the liquid-liquid phase region was extremely rapid; the single liquid phase could be re-established by increasing pressure.

Figure 6:
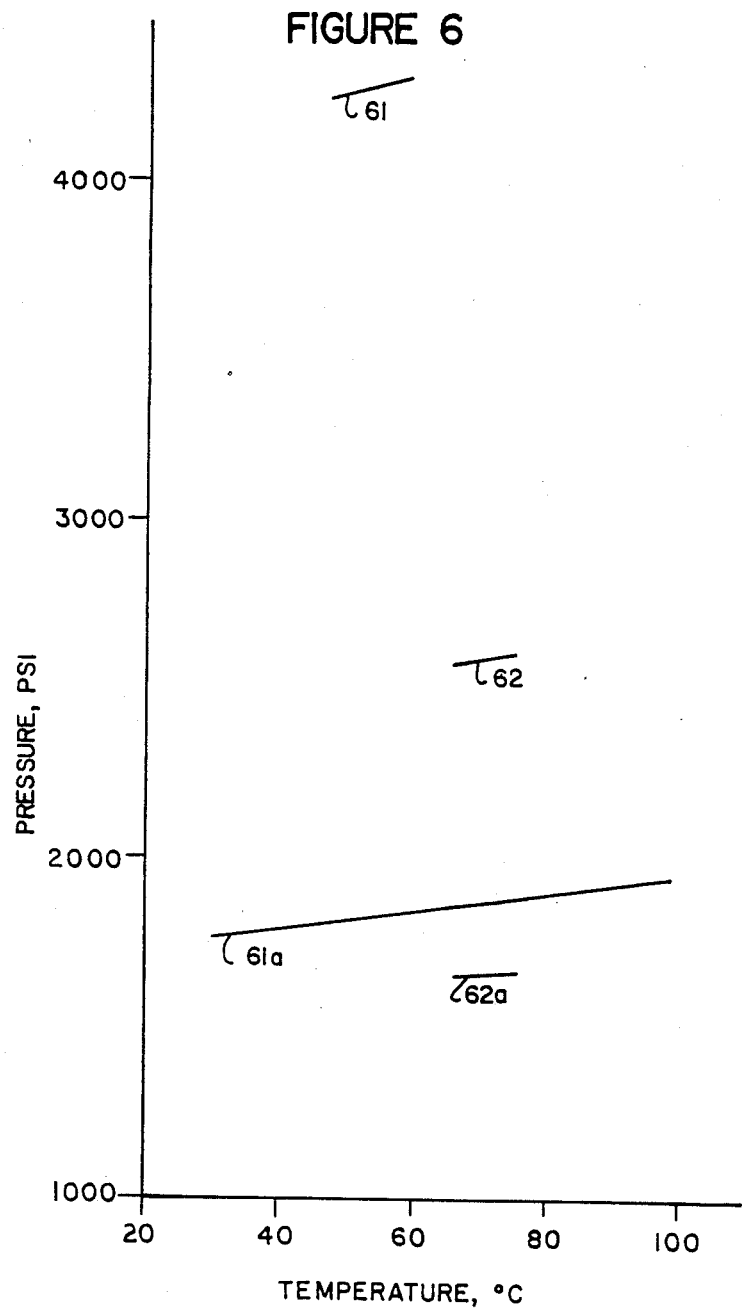

At 13.4 weight percent, the upper pressure, shown by line 61, was about 4200 psia, while the lower pressure, shown by line 61a, was about 1800 psia. The single liquid to liquid-liquid phase transition (line 61) was repeatedly observed. It can also be seen that the temperature over which the two liquid phase region exists encompasses those between the UCST and LCST of the polymer-solvent system and thus is in the broad temperature range. As shown in FIG. 6, at 11.5 weight percent methane, phase separation occurred over a broad temperature range when the methane pressure was reduced to below about 2600 psia. Similarly at 13.4 weight percent methane, phase separation occurs over a broad temperature range when the pressure is reduced below about 4200 psis.

The two phases constituted a hexane-rich substantially polymer free lighter, upper phase and a heavier polymer rich lower phase. The solvent rich phase comprised about 80–90 percent by volume of the test cell. The polymer rich phase comprised sticky strands which stuck to the wall of the cell at pressures in the proximity of the lower transition line, 61a, of FIG. 6. As is seen from FIG. 6 for both 11.5 weight percent and 13.4 weight percent methane, the merged LCST/UCST line is approximately parallel to the bubble point line.

EXAMPLE II

Since, after polymerization, the EPM polymer solution typically contains unreacted propylene, the experiment of Example I was repeated with 7 wt. % propylene included in the solvent system to determine what effect propylene has on the phase separation achieved by the technique of this invention.

The sample cell was loaded with the polymer solution, injected with the desired amount of methane and then injected with the desired amount of propylene.

The initial methane concentrations used were 10.8 and 14.4 weight percent on a total system basis After introduction of about 8.7 weight percent propylene and 7 weight percent propylene respectively, the methane concentration was reduced, as a result of dilution, to 9.8 weight percent and 13.4 percent, respectively.

Evaluation of these systems before and after injection of propylene confirmed that propylene does not have an adverse effect on the observed phase separation. Hence, mixtures of methane and propylene may be used as the PSA.

The phase volumes after separation were 60–70% by volume solvent rich phase and 30–40 percent by volume polymer rich phase. Again, the critical methane concentration was confirmed to be at least 11 weight percent on the total polymer solvent-PSA system.

Figure 7:
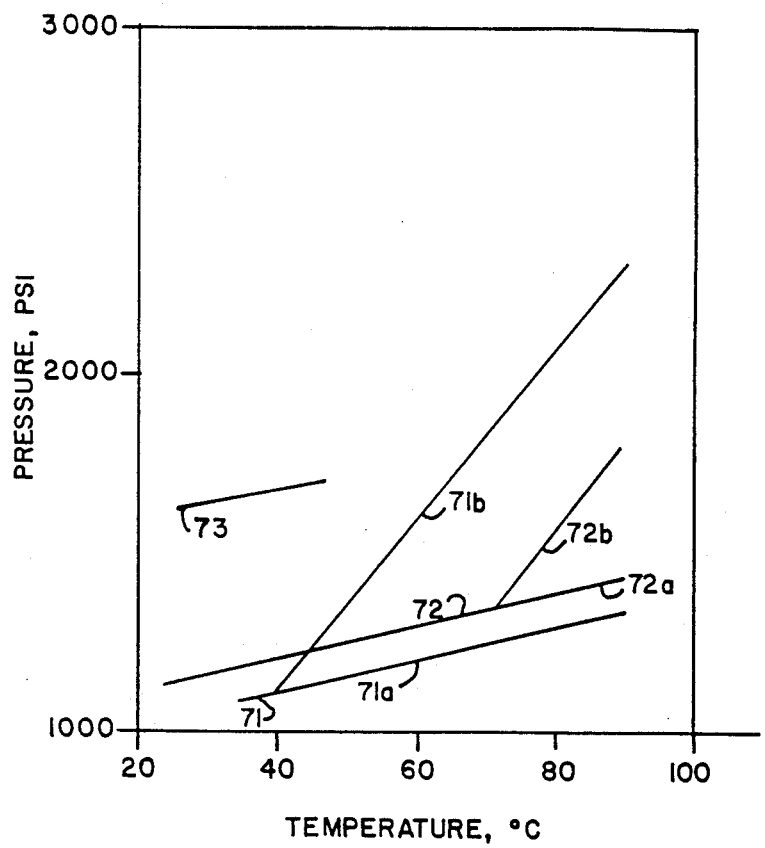

Referring now to FIG. 7, where 10.8 wt. % methane is used as the PSA, the phase diagram is the classical prior art phase diagram wherein the LCST line, 72b, intersects the bubble point line formed by segments 72 and 72a The area between the LCST line, 72b, and the bubble point line segment 72a, represents the region in which there exists a two phase liquid-liquid (L-L) system; one liquid phase is polymer rich, the other is solvent rich. Above (to the left) of the LCST line the system is homogeneous (L). Below the bubble point line and to the right cf the intersection of the LCST and bubble point line segment 72a, a liquid-liquid-vapor phase (LLV) exits; while below the bubble point line and to the left of the intersection of the LCST line and bubble point line segment 72, a homogenous liquid phase exists in equilibrium with a vapor phase (LV). As used in the specification and claims, the term "phase separation pressure" means a pressure below which phase separation will occur for a particular system.

Where the PSA is a combination of 9.8 wt. % methane and 8.7 wt. % propylene, the phase diagram is similar but the bubble point line segments 71 and 71a are about 100 psia lower and the intersection of the bubble point line and LCST line, 71b, has been shifted about 30° C. lower Where the solvent system includes 7.0 wt. % propylene and 13.4 wt. % methane, the bubble point line, 73, has been lowered by about 100 psi below the bubble point line, shown in FIG. 6 for 13.4 wt. % methane used alone Hence, it is evident that propylene is acting as a PSA in combination with methane As discussed above in connection with FIG. 6, the siginificance of the general parallelism in the region bounded by the phase boundary lines 61 and 61a is that twophase separation occurs over a broad temperature range. As can be seen from these data, this unique and unexpected result occurs for methane in this system if polymer and solvent is at a critical concentration of at least 11.0 weight percent based on the total weight of the solvent-polymerPSA system. Preferably at least 11.5 weight percent methane is used; more preferably at least 13 weight percent, e.g., at least 13.4 weight percent; most preferably at least 14 percent methane is used.

When similar experiments are conducted for the EPM/hexane system using ethylene, propylene or $CO_2$ as the phase separation agent, the same separation phenomenon as that observed for methane would be achieved. Where the phase separation agent is $CO_2$, the critical concentration is at least about 25 weight percent based on the PSAsolvent-polymer system, preferably at least 35 weight percent. $CO_2$ is used, more preferably at least about 45 weight percent. Where the PSA is ethylene, the critical concentration is at least about 22 weight percent based on the PSA-solvent-polymer system; preferably at least 26 weight percent is used; more preferably at least 28 weight percent; most preferably at least 30 weight percent, e.g., 35 weight percent. Where propylene is the PSA, the critical concentration is at least about 40 weight percent based on the PSA-solvent-polymer system; preferably at least 50 weight percent is used; more preferably at least 60 weight percent; most preferably 65 weight percent, e.g., 70 weight percent.

While the separation process of this invention may be carried out at any pressure at which two phase separation is achieved, preferably the separation is conducted at about the bubble point pressure of the system. The term "at about the bubble point pressure" as used in the specification and claims means a pressure range from about 10 psia below the bubble point pressure to about 300 psia above the bubble point pressure, e.g., 100–200 psia above the bubble point pressure. Those skilled in the art will appreciate from the foregoing disclosure that the bubble point pressure will be dependent on PSA concentration as well as system temperature. The particular bubble point pressure for a system is readily determined in the manner described above. The Table below presents typical bubble point pressures for a hexane-PSA system.

TABLE

| Bubble Point Pressure for Hexane-PSA System | | |
|---|---|---|
| | Concentration | Bubble Point Pressure (PSIA) |
| PSA | Wt. % | 250° C. (77° F.)  115° C. (240° F.) |

| PSA | Wt. % | 250° C. (77° F.) | 115° C. (240° F.) |
|---|---|---|---|
| $CO_2$ | 25 | 250 | 780 |
| | 35 | 346 | 1072 |
| | 45 | 435 | 1310 |
| $C_2H_4$ | 22 | 368 | 920 |
| | 26 | 420 | 1010 |
| | 28 | 450 | 1060 |
| | 30 | 460 | 1070 |
| | 32 | 470 | 1080 |
| | 35 | 480 | — |

TABLE-continued

| | Bubble Point Pressure for Hexane-PSA System | | |
|---|---|---|---|
| | Concentration | Bubble Point Pressure (PSIA) | |
| PSA | Wt. % | 250° C. (77° F.) | 115° C. (240° F.) |
| $C_3H_7$ | 40 | 95 | 447 |
| | 50 | 125 | 520 |
| | 60 | 150 | 610 |
| | 65 | 160 | 655 |
| | 70 | 175 | 710 |
| $CH_4$ | 12 | 1438 | |
| | 16 | 1526 | |
| | 20 | 2520 | |

For methane, the preferred operating pressure range is about 1450 psia to about 4300 psia; more preferably about 1600 psia to about 2600 psia; e.g., 2000 psia. For ethylene, the preferred operating pressure range is about 360 psia to about 1300 psia; more preferably about 500 psia to about 1100 psia, e.g., 800 psia. For propylene, the preferred operating pressure range is about 90 psia to about 1000 psia; more preferably about 125 psia to about 700 psia, e.g., 650 psia. For $CO_2$ the preferred operating pressure range is preferably about 240 psia to about 1600 psia; more preferably about 350 psia to about 1000 psia; most preferably about 400 psia to about 850 psia; e.g., 600 psia.

In general, separation will occur rapidly except for the very narrow region in the proximity of the liquid/liquid-liquid transition lines, where the densities of the respective liquid phases are nearly equal to one another. It is thus preferred to operate at pressures where the density differences between the phases is at a maximum so that phase separation rates are at a maximum. In the two inch diameter test cell used, the two phases will generally fully separate in about five seconds. It is significant that the phase separation can be caused to occur in temperature ranges which include the EPM polymerization temperature (i.e. about 20°-70° C.). Hence, unlike prior art phase separation processes, no additional heat input is required to cause separation. Furthermore, since phase separation results in a low volume of polymer rich phase (10–40%), the energy requirements for polymer finishing are greatly reduced.

Utilizing the method of this invention, the phase separation which occurs results in at least 66% by volume of solvent rich phase as compared to about 50% for prior art techniques. This is so even at about 10.8 wt. % methane in the region where the phase diagram is the classical diagram as shown in FIG. 6. Where methane is used as the sole PSA, at a loading of at least 13.4 wt. %, the phase split is about 80/20 solvent rich phase to polymer rich phase.

While the above invention has been described in terms of specific examples, it is intended that the invention will include steps and techniques that are deemed by those in the art as equivalents. For example, this invention can be practiced directly in the polymerization process as well as in post polymerization treatments or in polymer solvent solutions apart from polymerization processes.

What is claimed is:

1. A process for separating a polymer from a solvent in which it is dissolved which comprises:
   (1) introducing a phase separation agent (PSA) into said solution to form a system, said agent being a gas at 25° C. and one atmosphere absolute, the concentration of said agent in the system being at least equal to a critical concentration for said agent;
   (2) conducting a separation in the system whereby a liquid, solvent rich phase is separated from a liquid, polymer rich phase, said separation being conducted at a concentration of PSA in the liquid phases, of at least a critical amount effective to impart to the system, phase relationships which are substantially temperature-independent with respect to a first region having two liquid phases, a second region having liquid-liquid-vapor phases and a third region having a homogenous liquid phase, over a temperature range below the Lower Critical Solution Temperature and down to the Upper Critical Solution Temperature points of the pure solvent-polymer combination; the separation being carried out at a preselected pressure at which the system separates into at least two distinct phases comprising a first liquid, solvent-rich phase and a second liquid, polymer-rich phase;
   (3) separating the polymer-rich phase from the system; and
   (4) recovering the polymer from the polymer-rich phase.

2. The process of claim 1 wherein the separation of step 3 is conducted in the liquidphase phases of said first region.

3. The process of claim 1 where the separation of step 3 is conducted in the liquid-liquid-vapor phases of said second region.

4. A process according to claim 1 wherein said separation temperature in step 2 is from about 20° C. to 100° C.

5. A process according to claim 1 wherein the PSA comprises methane.

6. A process according to claim 1 wherein the polymer is a hydrocarbon polymer.

7. A process according to claim 4 wherein the separation of step 2 is achieved by additionally adjusting the pressure of said system.

8. A process according to claim 1 wherein the separation of step is simultaneous with the recovery of step 4.

9. The process of claim 1 wherein the separation of step 2 is conducted at a temperature of up to about the LCST point.

10. The process according to claim 1 wherein the PSA comprises methane and the separation of step 2 is conducted at a temperature in the range of from about 20° C. to 100° C.

11. A process according to claim 1 wherein the polymer is selected from ethylene-propylene and ethylene-propylene nonconjugated diene rubbers.

12. A process according to claim 11 wherein the separation of step 2 is conducted at a temperature above the UCST point.

13. A process according to claim 1 wherein the polymer is selected from the group consisting of EPM and EPDM rubbers and said separation temperature in step 2 is from about 20° C. to 100° C.

14. A process for separating a polymer from a solution comprising hexane in which it was polymerized and which contains unreacted monomer comprising:
   (1) introducing a phase separation agent (PSA) into said solution to form a system, said agent being a gas at 25° C. and one atmosphere absolute the concentration of said agent being at least equal to a critical concentration of said agent for said system;
   (2) conducting a separation in the system to separate a liquid, hexane-rich phase from a liquid, polymer-rich phase said separation being conducted at a concentration of PSA in the liquid phases, of at least a critical amount effective to impart to the system, phase relationships which are substantially temperature independent, with respect to a first region having two liquid phases, a second region having liquid-liquid-vapor phases and a third region having a homogeneous liquid phase; over a temperature range below the Lower Critical Solution Temperature and the Upper Critical Solution Temperature points of the pure solvent-polymer combination; the separation being carried out at a preselected pressure at which the system separates into at least two phases comprising a first liquid, solvent-rich phase and a second liquid, polymer-rich phase;

(3) separating the polymer-rich phase from the system; and (4) recovering the polymer from the polymerrich phase.

15. The process according to 14 wherein the separation of step 3 is conducted in the first region.

16. The process according to 14 wherein the separation of step 3 is conducted in the second region.

17. The process according to 14 wherein said separation temperature in step 2 is from about 20° C. to 100° C.

18. The process according to claim 14 wherein the phase separation agent is methane, the polymer is an EPM or EPDM and the methane is utilized at a concentration in the system of at least 11.5 wt. %.

19. The process of claim 14 wherein the polymer is selected from the group consisting of ethylene-propylene and ethylene-propylene-nonconjugated diene rubbers.

20. The process according to claim 1 wherein the polymer is selected from the group consisting of butyl and halobutyl rubbers.

21. The process according to claim 1 wherein the phase separation agent is $CO_2$, CO, hydrogen, helium, neon, nitrogen, an oxide of nitrogen, or mixtures thereof.

22. The process according to claim 1 wherein the phase separation agent is $CO_2$ or nitrogen and the polymer is selected from the group consisting of EPM, EPDM, butyl rubber and halo butyl rubber.

23. The process according to claim 14 wherein the phase separation agent is $CO_2$ or nitrogen and the polymer is selected from the group consisting of EPM, EPDM, butyl rubber and halo butyl rubber.

* * * * *